(12) United States Patent
Hirose et al.

(10) Patent No.: US 10,439,195 B2
(45) Date of Patent: Oct. 8, 2019

(54) POWER STORAGE DEVICE

(71) Applicant: KABUSHIKI KAISHA TOYOTA JIDOSHOKKI, Kariya-shi, Aichi-ken (JP)

(72) Inventors: Takayuki Hirose, Kariya (JP); Motoaki Okuda, Kariya (JP); Hiroyasu Nishihara, Kariya (JP); Kojiro Tamaru, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 56 days.

(21) Appl. No.: 15/555,607

(22) PCT Filed: Mar. 8, 2016

(86) PCT No.: PCT/JP2016/057189
§ 371 (c)(1),
(2) Date: Sep. 5, 2017

(87) PCT Pub. No.: WO2016/147955
PCT Pub. Date: Sep. 22, 2016

(65) Prior Publication Data
US 2018/0047971 A1 Feb. 15, 2018

(30) Foreign Application Priority Data
Mar. 13, 2015 (JP) .................. 2015-051038

(51) Int. Cl.
*H01M 2/00* (2006.01)
*H01M 2/34* (2006.01)
(Continued)

(52) U.S. Cl.
CPC .............. *H01M 2/34* (2013.01); *H01G 11/08* (2013.01); *H01G 11/12* (2013.01); *H01G 11/16* (2013.01);
(Continued)

(58) Field of Classification Search
CPC ........ H01M 2/34; H01M 2/26; H01M 2/0277; H01M 2/345; H01G 11/74; H01G 11/16; H01G 11/06; H01G 11/14; H02H 7/16
See application file for complete search history.

(56) References Cited

U.S. PATENT DOCUMENTS

2010/0178539 A1* 7/2010 Elia ...................... H01M 2/1241
429/56
2015/0207132 A1* 7/2015 Minagata ................ H01M 2/22
429/7

FOREIGN PATENT DOCUMENTS

JP  06-243856 A  9/1994
JP  2004-014395 A  1/2004
(Continued)

OTHER PUBLICATIONS

International Preliminary Report on Patentability with the translation of Written Opinion dated Sep. 19, 2017 issued by the International Bureau in International application No. PCT/JP2016/057189.

*Primary Examiner* — Cynthia H Kelly
*Assistant Examiner* — Monique M Wills
(74) *Attorney, Agent, or Firm* — Sughrue Mion, PLLC

(57) ABSTRACT

A power storage device includes a case accommodating an electrode assembly and having a lid, a current interrupting device, and an insulating member. The electrode assembly has a tab-side end face opposed to an inner face of the lid. The current interrupting device has a device end face opposed to the tab-side end face. The insulating member has an insulating end face opposed to the tab-side end face. A distance from the inner face to the device end face in a state (Continued)

where the current interrupting device is positioned closest to the inner face is defined as a first dimension. A distance from the inner face to the insulating end face in a state where the insulating member is positioned closest to the inner face is defined as a second dimension. The first dimension is smaller than the second dimension.

18 Claims, 6 Drawing Sheets

(51) Int. Cl.
| | |
|---|---|
| *H01G 11/16* | (2013.01) |
| *H01M 2/02* | (2006.01) |
| *H01M 2/26* | (2006.01) |
| *H02H 7/16* | (2006.01) |
| *H02H 7/18* | (2006.01) |
| *H01G 11/08* | (2013.01) |
| *H01G 11/12* | (2013.01) |
| *H01G 11/76* | (2013.01) |
| *H01G 11/82* | (2013.01) |
| *H01G 11/74* | (2013.01) |
| *H01M 2/04* | (2006.01) |
| *H01G 11/06* | (2013.01) |
| *H01G 11/78* | (2013.01) |

(52) U.S. Cl.
CPC .............. *H01G 11/76* (2013.01); *H01G 11/82* (2013.01); *H01M 2/0277* (2013.01); *H01M 2/26* (2013.01); *H01M 2/345* (2013.01); *H02H 7/16* (2013.01); *H02H 7/18* (2013.01); *H01G 11/06* (2013.01); *H01G 11/74* (2013.01); *H01G 11/78* (2013.01); *H01M 2/043* (2013.01); *H01M 2/0473* (2013.01)

(56) References Cited

FOREIGN PATENT DOCUMENTS

| | | |
|---|---|---|
| JP | 2012-119183 A | 6/2012 |
| JP | 2013-054915 A | 3/2013 |

* cited by examiner

POWER STORAGE DEVICE

CROSS REFERENCE TO RELATED APPLICATIONS

This application is a National Stage of International Application No. PCT/JP2016/057189 filed Mar. 8, 2016, claiming priority based on Japanese Patent Application No. 2015-051038 filed Mar. 13, 2015, the contents of all of which are incorporated herein by reference in their entirety.

TECHNICAL FIELD

The present invention relates to a power storage device provided with a current interrupting device arranged in a conduction path for electrically connecting a tab and an electrode terminal, and an insulating member arranged inside a case.

BACKGROUND ART

Conventionally, lithium ion rechargeable batteries and nickel-metal hydride rechargeable batteries are mounted on vehicles such as electric vehicles (EVs) and plug-in hybrid vehicles (PHVs) as a power storage device for storing power to be supplied to electric motors or the like. Generally, a rechargeable battery includes an electrode assembly of positive electrodes and negative electrodes having active material layers stacked in layers, and a case that accommodates this electrode assembly. One type of case has a case body with an opening for allowing insertion of the electrode assembly, and a lid for closing the opening of the case body. Tabs protrude from one side of the positive electrodes and negative electrodes, and conductor members of respective polarities are joined to the tabs. Electrode terminals of respective polarities are electrically connected to the conductor members.

The rechargeable battery also includes a current interrupting device that interrupts the conduction path electrically connecting the positive electrodes and the positive terminal when the internal pressure of the case exceeds a predetermined level (see, for example, Patent Document 1). In the rechargeable battery of Patent Document 1, the current interrupting device is integrated with the positive terminal, and positioned in a space defined between the inner face of the lid and an end face of the electrode assembly opposed to the inner face of the lid.

In one method of assembling such a rechargeable battery, the electrode assembly and the lid are joined together in advance, and after inserting the electrode assembly into the case body, the lid is welded to the case body. More specifically, positive and negative conductor members are connected to the tabs of corresponding polarities of the electrode assembly, and positive and negative terminals are connected to the conductor members of corresponding polarities, after which part of each electrode terminal is passed through each of two through-holes provided in the lid. The current interrupting device has already been integrated with the positive terminal. The electrode terminals are then fixed to the lid. Thereby, the electrode assembly that has been joined to the electrode terminals via the conductor members is also integrated to the lid. When the lid and the electrode assembly are integrated, the current interrupting device is exposed, facing the electrode assembly. After that, the electrode assembly is accommodated in the case body, and the assembling of the rechargeable battery is complete when the lid and the case body are bonded together to close the opening of the body.

PRIOR ART DOCUMENT

Patent Document

Patent Document 1: Japanese Laid-Open Patent Publication No. 2012-119183

SUMMARY OF THE INVENTION

Problems that the Invention is to Solve

The electrode terminals are fixed to the lid, and the conductor members are welded to the electrode terminals, so that the lid, electrode terminals, and conductor members together constitute an integrated rigid body (lid structure). This lid structure and the electrode assembly are coupled together only via tabs, which are, for example, parts of metal foils that are current collectors of the electrodes so that the tabs allow the lid structure and the electrode assembly to move relative to each other. Therefore, with the electrode assembly and the lid structure being integrated, when the electrode assembly alone is inserted into the case body, the current interrupting device moves toward the electrode assembly together with the electrode terminals that are integrated with the lid, as the lid is pressed toward the electrode assembly. The current interrupting device may then contact the electrode assembly, which may lead to malfunction or deformation of the device. Also when the power storage device is subjected to vibration during initial charging or transportation, the tabs may be displaced and allow the electrode assembly to move toward the current interrupting device. The electrode assembly may then contact the current interrupting device, which may lead to malfunction or deformation of the current interrupting device.

An objective of the present invention is to provide a power storage device that restrains contact between an electrode assembly and a current interrupting device.

Means for Solving the Problems

To achieve the foregoing objective and in accordance with one aspect of the present invention, a power storage device is provided that includes an electrode assembly, a case, an electrode terminal, a current interrupting device, and an insulating member arranged inside the case. The electrode assembly is configured by stacking electrodes having tabs. The case is configured to accommodate the electrode assembly and has a case body with an opening and a lid, which closes the opening. The electrode terminal electrically is connected to the tabs and passing through the lid to protrude out of the case. The current interrupting device is arranged in a conduction path that electrically connects the tabs and the electrode terminal. The electrode assembly has a tab-side end face opposed to an inner face of the lid. The tabs protrude from the tab-side end face. The current interrupting device is arranged in a space defined between the tab-side end face and the inner face of the lid. A direction of a line that connects the inner face of the lid and the tab-side end face with a shortest distance is defined as an opposing direction. The current interrupting device has a device end face opposed to the tab-side end face. The insulating member has an insulating end face opposed to the tab-side end face. A distance from the inner face of the lid to the device end face along the opposing direction in a state where the current interrupting device is positioned closest to the inner face of the lid is defined as a first dimension. A distance from the inner face of the lid to the insulating end face along the opposing direction in a state where the insulating member is positioned closest to the inner face of the lid is defined as a second dimension. The first dimension is smaller than the second dimension.

Thus, when assembling the power storage device, the tabs of the electrode assembly and the electrode terminals are electrically connected via the conduction path, and the electrode terminals are fixed to the lid, so that the lid and the electrode assembly are integrated. With the lid and the electrode assembly being integrated, the insulating member is also integrally assembled to the lid and the electrode assembly, and the current interrupting device is also arranged in the conduction path. When the lid and the electrode assembly are united, the lid and the electrode terminals make an integrated solid structure. This lid and the electrode assembly are connected only via the tabs. Since the tabs are parts of metal foils that are current collectors of the electrodes, for example, the tabs allow the lid and the electrode assembly to move relative to each other.

With the lid and the electrode assembly being integrated, when the electrode assembly alone is inserted into the case body from the opening of the case body, the lid is sometimes pressed toward the electrode assembly so as to push the electrode assembly toward the case body. At this time, when the lid is pushed in, the tabs are displaced and the insulating member is pressed toward the electrode assembly. At the same time, when the lid is pushed in, the tabs are displaced and the current interrupting device also moves toward the electrode assembly together with the lid. At this time, the insulating end face of the insulating member contacts the tab-side end face of the electrode assembly before the device end face of the current interrupting device contacts the tab-side end face of the electrode assembly, because of the first dimension being smaller than the second dimension. The contact between the insulating end face and the tab-side end face stops the lid from being further pushed in. As a result, contact between the tab-side end face of the electrode assembly and the device end face of the current interrupting device can be restrained when the electrode assembly is inserted into the case body.

When the power storage device is subjected to vibration during mounting to a vehicle or the like or during transportation, the tabs are displaced and allow the electrode assembly to move toward the current interrupting device. At this time, the tab-side end face contacts the insulating end face of the insulating member before the tab-side end face of the electrode assembly contacts the device end face of the current interrupting device, because of the first dimension being smaller than the second dimension. The contact between the tab-side end face and the insulating end face restricts further movement of the electrode assembly toward the current interrupting device. As a result, contact between the tab-side end face of the electrode assembly and the device end face of the current interrupting device can be restrained when the power storage device is subjected to vibration.

The power storage device further includes a conductor member, which is located between the inner face of the lid and the tab-side end face and constitutes the conduction path. The conductor member connects the electrode terminal and the tabs having a same polarity. The insulating member insulates the conductor member from the lid.

In the above-described power storage device, the insulating member is arranged to extend over the conductor members of mutually different polarities.

Thus, the insulating member is located between the conductor member and the lid. Therefore, when assembling the power storage device, the insulating member is pressed by the lid toward the electrode assembly as the lid is pressed toward the electrode assembly, and the insulating member comes closest to the lid. The second dimension is set in this closest position, so that the insulating member can contact the electrode assembly before the current interrupting device does, and thus the current interrupting device can be protected.

In the above-described power storage device, the tabs of mutually different polarities protrude from the tab-side end face.

In the above described power storage device, the electrode terminal and the tabs having the same polarity are arranged along an arrangement direction that is a direction of a line extending along the tab-side end face and connecting the tabs of mutually different polarities.

Thus, the size of the power storage device along the opposing direction is reduced as compared to the case where the tabs and electrode terminals of each polarity overlap each other in the opposing direction.

In the above-described power storage device, when the insulating member is positioned closest to the inner face of the lid, an outer face of the insulating member contacts the inner face of the lid, and the second dimension is a height of the insulating member from the insulating end face to the outer face.

Thus, the contact between the device end face of the current interrupting device and the tab-side end face can be restrained using the height of the insulating member.

The above-described power storage device is a rechargeable battery.

Effects of the Invention

According to the present invention, the contact between the electrode assembly and the current interrupting device can be restrained.

MODES FOR CARRYING OUT THE INVENTION

First Embodiment

A rechargeable battery 10 according to a first embodiment will now be described with reference to FIGS. 1A to 5.

Figure 1A:
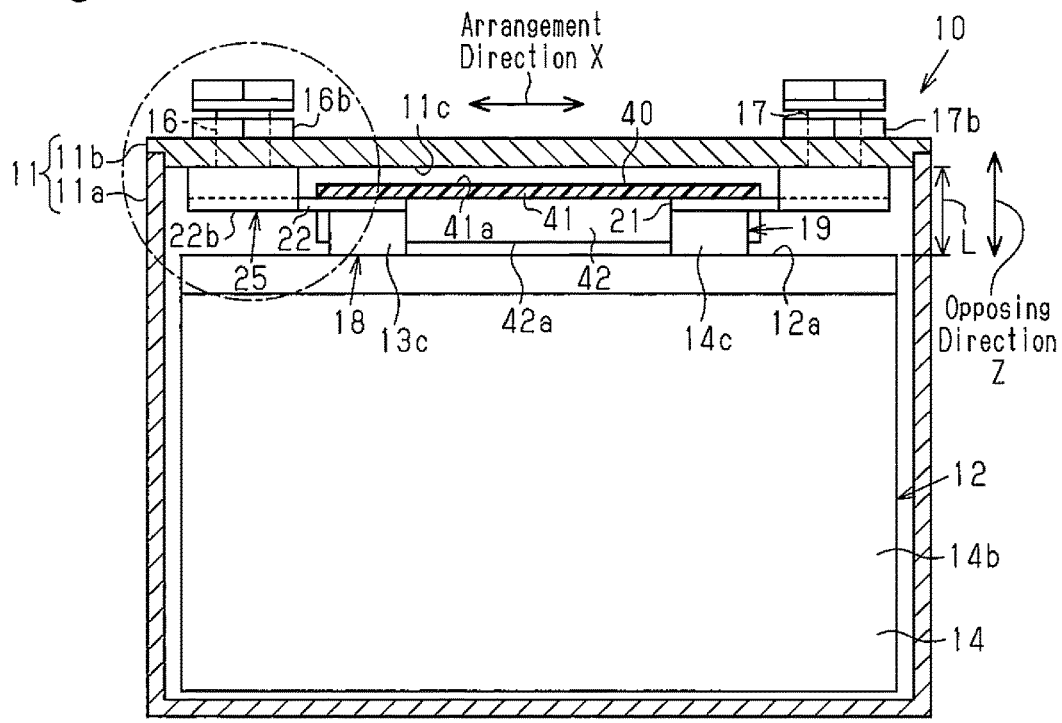
FIG. 1A is a cross-sectional view schematically illustrating a rechargeable battery of a first embodiment.

As shown in FIG. 1A, the rechargeable battery 10 as a power storage device includes a rectangular parallelepiped case 11, and an electrode assembly 12 is accommodated inside this case 11. The case 11 includes a rectangular tubular case body 11a made of metal (e.g., aluminum or aluminum alloy) and having an opening and a bottom, and a lid 11b that closes the opening of the case body 11a. Electrolyte (electrolytic solution) (not shown) is accommodated in the case 11. The rechargeable battery 10 of this embodiment is a lithium ion rechargeable battery.

Figure 2:
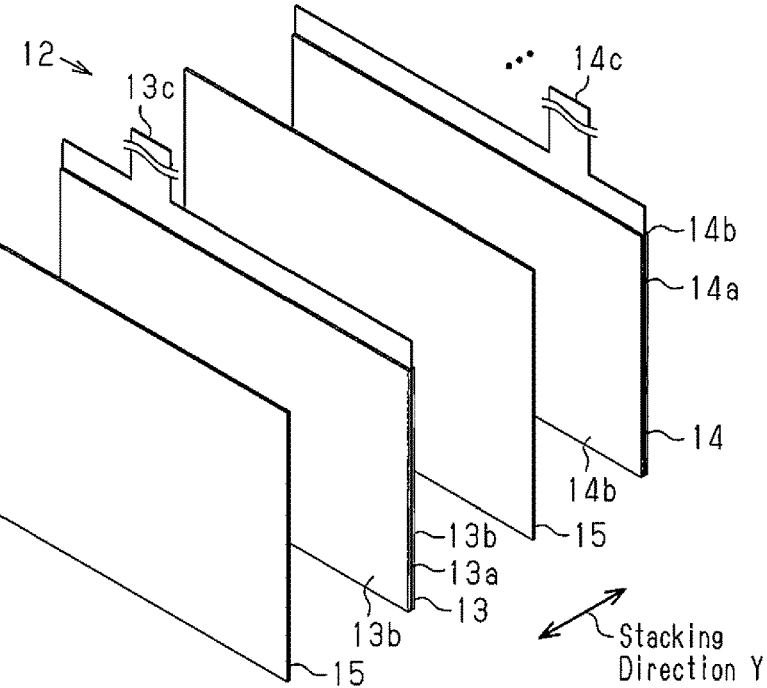
FIG. 2 is an exploded perspective view illustrating constituent elements of the electrode assembly.

As shown in FIG. 2, the electrode assembly 12 includes rectangular sheet-like positive electrodes 13 and rectangular sheet-like negative electrodes 14. The positive electrodes 13 and negative electrodes 14 are stacked upon one another with sheet-like separators 15 located therebetween, i.e., the electrode assembly 12 is of a type known as "stacked type". In the electrode assembly 12, the positive electrodes 13 and negative electrodes 14 are insulated from each other by the separators 15. In the following description, the direction in which the positive electrodes 13 and negative electrodes 14 are stacked will be referred to as a stacking direction Y.

The positive electrode 13 includes a substantially rectangular positive electrode metal foil 13a, positive electrode active material layers 13b provided on both sides of the foil, and a positive tab 13c protruding from one edge (one side) of the metal foil 13a.

As shown in FIG. 1A, positive electrodes 13 are stacked up, so that a positive tab stack 18 constituted by positive tabs 13c stacked in layers protrudes on one end face of the electrode assembly 12. The metal foil 13a is an aluminum foil, for example. The positive tab stack 18 is constituted by gathering the positive tabs 13c to one end in the stacking direction Y of the electrode assembly 12 and folding them back to the other end in the stacking direction Y.

Figure 3:
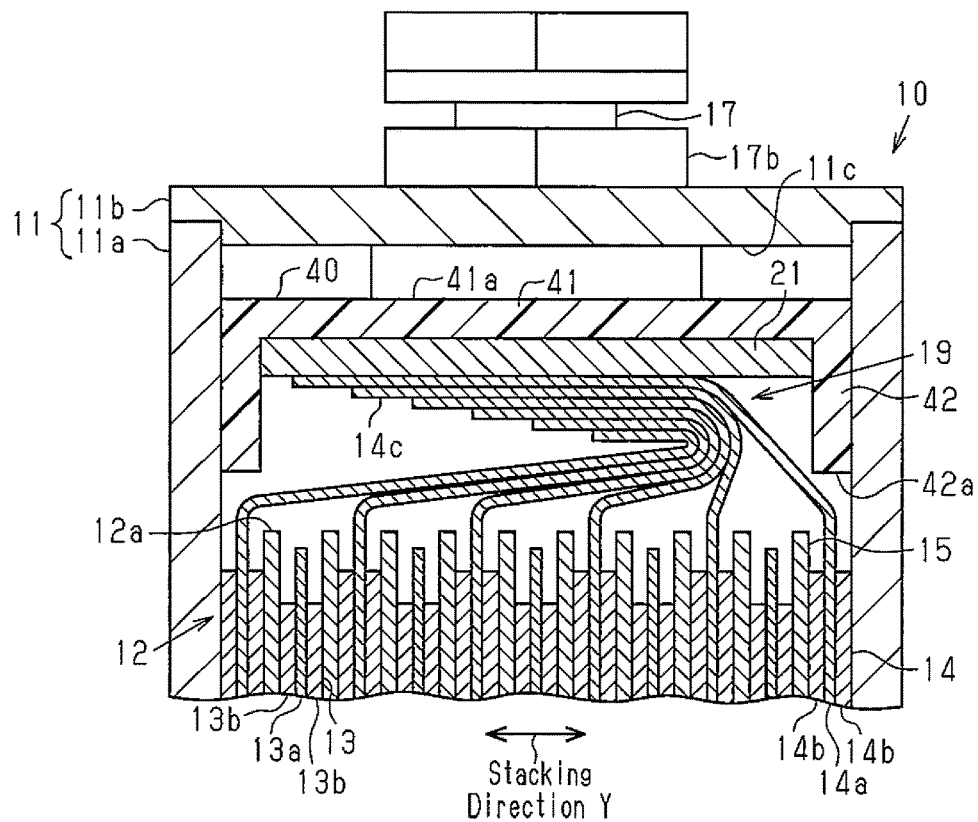
FIG. 3 is a partial cross-sectional view illustrating the inside of the rechargeable battery of the first embodiment.

As shown in FIG. 2, the negative electrode 14 includes a substantially rectangular metal foil 14a, negative electrode active material layers 14b provided on both sides of the foil, and a negative tab 14c protruding from one edge (one side) of the metal foil 14a. As shown in FIG. 1A, negative electrodes 14 are stacked up, so that a negative tab stack 19 constituted by negative tabs 14c stacked in layers protrudes on one end face of the electrode assembly 12. The metal foil 14a of the negative electrode 14 is a copper foil, for example. As shown in FIG. 3, the negative tab stack 19 is formed by gathering the negative tabs 14c to one end in the stacking direction Y of the electrode assembly 12 and folding them back to the other end in the stacking direction Y. The electrode assembly 12 has a tab-side end face 12a in the end face where the positive tab stack 18 (positive tabs 13c) and negative tab stack 19 (negative tabs 14c) protrude. The positive tabs 13c and negative tabs 14c, which are tabs of different polarities, protrude from this tab-side end face 12a.

As shown in FIG. 1A, the direction of a line extending along the tab-side end face 12a and connecting the positive tab stack 18 (positive tabs 13c) and negative tab stack 19 (negative tabs 14c) on the tab-side end face 12a, i.e., the direction in which the tab stacks 18 and 19 of different polarities are arranged side by side, will be referred to as an arrangement direction X. The direction of the shortest line connecting the inner face 11c of the lid 11b and the tab-side end face 12a of the rechargeable battery 10 will be referred to as an opposing direction Z. There is defined a space between the inner face 11c of the lid 11b and the tab-side end face 12a with an opposing distance L, the opposing distance L being the shortest distance along the opposing direction Z between the inner face 11c of the lid 11b and the tab-side end face 12a.

The rechargeable battery 10 includes a positive terminal 16 as the positive electrode terminal fixed to the lid 11b so as to protrude to the outside of the case 11, and a negative terminal 17 as the negative electrode terminal fixed to the lid 11b so as to protrude to the outside of the case 11. The positive terminal 16 and negative terminal 17 are arranged side by side in the arrangement direction X. The positive tab stack 18 (positive tabs 13c) and the positive terminal 16 are arranged side by side in the arrangement direction X, and the negative tab stack 19 (negative tabs 14c) and the negative terminal 17 are arranged side by side in the arrangement direction X.

The negative terminal 17 includes an external thread (not shown) at the end protruding out of the case 11, with a nut 17b mated with this external thread. The negative terminal 17 is fastened to the lid 11b, with the lid 11b being sandwiched between one end (not shown) of the negative terminal 17 protruding into the case 11 and the nut 17b.

The negative terminal 17 is electrically connected to the negative tab stack 19 (negative tabs 14c) of the electrode assembly 12 via a rectangular sheet-like negative conductor member 21 made of metal (e.g., copper) and joined to the end of the negative terminal 17 protruding into the case 11. The negative conductor member 21 and the negative tab stack 19 are joined together. The joint portion between the negative conductor member 21 and the negative tab stack 19 is positioned between the inner face 11c of the lid 11b and the tab-side end face 12a. The negative conductor member 21 is arranged parallel to the tab-side end face 12a of the electrode assembly 12 and located between the tab-side end face 12a and the inner face 11c of the lid 11b.

Figure 1B:
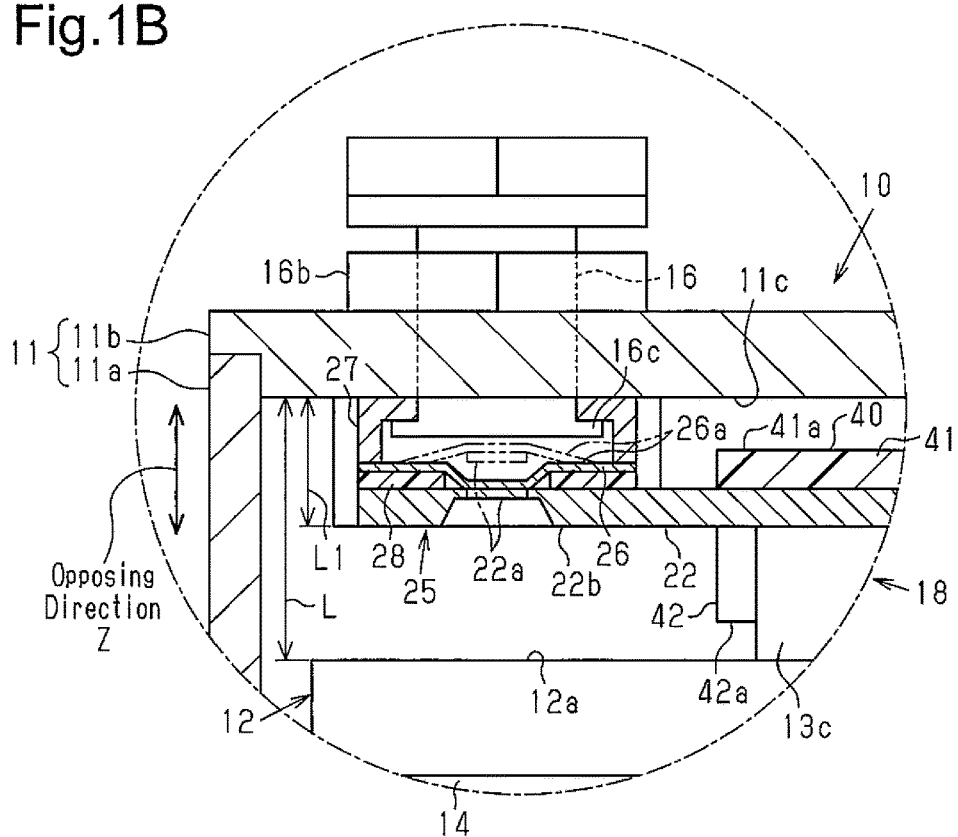
FIG. 1B is an enlarged view of encircled part of FIG. 1A, illustrating the vicinity of a current interrupting device.

As shown in FIG. 1B, the positive terminal 16 includes an external thread (not shown) at the end protruding out of the case 11, with a nut 16b mated with this external thread. The positive terminal 16 is fastened to the lid 11b, with the lid 11b being sandwiched between the end 16c of the positive terminal 16 protruding into the case 11 and the nut 16b. The positive terminal 16 is electrically connected to the positive tab stack 18 (positive tabs 13c) of the electrode assembly 12 via a rectangular sheet-like positive conductor member 22 made of metal (e.g., aluminum) and electrically connected to the end 16c of the positive terminal 16 protruding into the case 11. The positive conductor member 22 and the positive tab stack 18 are joined together. The joint portion between the positive conductor member 22 and the positive tab stack 18 is positioned between the inner face 11c of the lid 11b and the tab-side end face 12a. The positive conductor member 22 is arranged parallel to the tab-side end face 12a of the electrode assembly 12 and located between the tab-side end face 12a and the inner face 11c of the lid 11b. The positive conductor member 22 constitutes part of the conduction path electrically connecting the positive electrodes 13 and the positive terminal 16.

The rechargeable battery 10 includes a current interrupting device 25. This current interrupting device 25 is provided in the conduction path electrically connecting the positive electrodes 13 and the positive terminal 16. The positive conductor member 22 that constitutes part of the conduction path is arranged in the space defined between the inner face 11c of the lid 11b and the tab-side end face 12a of the electrode assembly 12. Therefore, the current interrupting device 25 provided in the conduction path is positioned in the space defined between the inner face 11c of the lid 11b and the tab-side end face 12a of the electrode assembly 12. The current interrupting device 25 is configured to be able to interrupt the conduction path between the positive electrodes 13 and the positive terminal 16 when the internal pressure of the case 11 exceeds a predetermined level.

The current interrupting device 25 is provided between the end 16c of the positive terminal 16 and the positive conductor member 22 inside the case 11. The current interrupting device 25 includes an invertible plate 26 made of metal (e.g., aluminum or aluminum alloy) electrically connected to the end 16c of the positive terminal 16 via a connecting member 27. An insulating plate 28 is located between the invertible plate 26 and the positive conductor member 22.

The invertible plate 26 includes a displacement portion 26a that can be displaced toward the lid 11b when it receives the internal pressure of the case 11 upon the internal pressure of the case 11 exceeding a predetermined level. A separable portion 22a of the positive conductor member 22 configured to break and separate from the positive conductor member 22 is connected to the displacement portion 26a. Namely, the separable portion 22a of the conductor member 22 constitutes part of the current interrupting device 25. As described above, in the rechargeable battery 10 of this embodiment, part of the current interrupting device 25 that is made of metal (separable portion 22a) is arranged to be opposed to the tab-side end face 12a of the electrode assembly 12.

In the current interrupting device 25, the displacement portion 26a is in contact with the positive conductor member 22, and therefore the positive conductor member 22 can be regarded as part of the current interrupting device 25. It follows that one side of the positive conductor member 22 facing the tab-side end face 12a can be regarded as one side of the current interrupting device 25 facing the tab-side end face 12a. This side of the positive conductor member 22 facing the tab-side end face 12a will be referred to as a device end face 22b. The current interrupting device 25 is integrated with the positive terminal 16, which is fixed to the lid 11b by the nut 16b. Therefore, the current interrupting device 25 is not able to be displaced relative to the lid 11b. Accordingly, the current interrupting device 25 is always positioned closest to the lid 11b. The distance from the inner face 11c of the lid 11b to the device end face 22b along the opposing direction Z will be referred to as a first dimension L1. This first dimension L1 is shorter than the opposing distance L, which means that the device end face 22b is distanced from the tab-side end face 12a of the electrode assembly 12 along the opposing direction Z inside the rechargeable battery 10.

In the rechargeable battery 10, as indicated with a long dashed double-short dashed line in FIG. 1B, when the internal pressure of the case 11 rises and exceeds a predetermined level, the internal pressure of the case 11 displaces the displacement portion 26a of the invertible plate 26 toward the lid 11b. This brings about separation of the separable portion 22a from the positive conductor member 22, so that the conduction path between the positive electrodes 13 and the positive terminal 16 is physically cut off and the current is thus interrupted in the rechargeable battery 10.

As shown in FIGS. 1A and 3, the rechargeable battery 10 includes an insulating member 40, which insulates the negative conductor member 21 and positive conductor member 22 from the lid 11b, inside the case 11. The insulating member 40 is made of resin, for example. The insulating member 40 has a rectangular plate-like main body 41, and side walls 42 extending from a pair of long side edges of the main body 41 toward the electrode assembly 12, so that it has an inverted U shape (channel shape) when viewed from the arrangement direction X. The main body 41 is arranged to extend over the negative conductor member 21 and the positive conductor member 22. The length of the short sides of the main body 41 of the insulating member 40 is shorter than that of the short sides of the lid 11b and slightly longer than that of the short sides of the negative conductor member 21 and positive conductor member 22. The side walls 42 protrude from the main body 41 toward the tab-side end face 12a of the electrode assembly 12.

The surface of the main body 41 of the insulating member 40 facing the inner face 11c of the lid 11b will be referred to as an outer face 41a, and the surface of the side walls 42 of the insulating member 40 facing the tab-side end face 12a of the electrode assembly 12 will be referred to as an insulating end face 42a.

Figure 5:
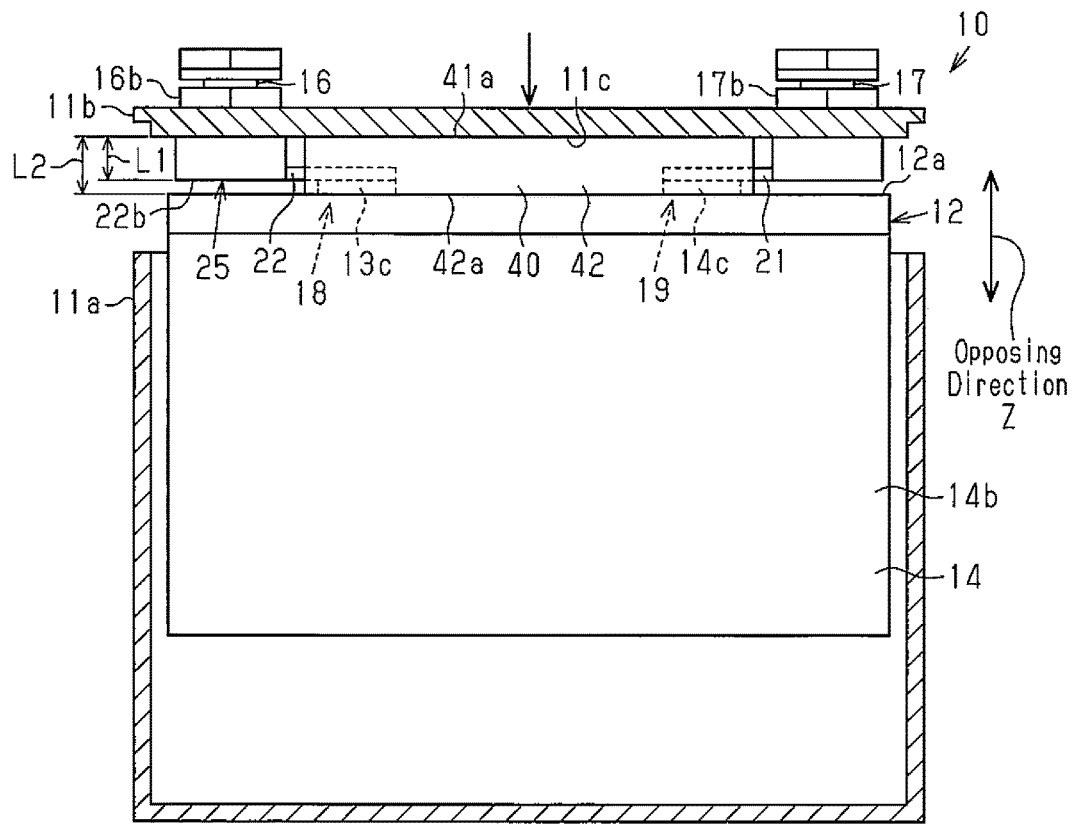
FIG. 5 is a diagram illustrating a state where the electrode assembly is inserted into a case body.

The position where the insulating member 40 is located closest to the lid 11b as shown in FIG. 5, with the outer face 41a of the main body 41 of the insulating member 40 being in contact with the inner face 11c of the lid 11b, will be referred to as a closest position. The distance from the inner face 11c of the lid 11b to the insulating end face 42a along the opposing direction Z when the insulating member 40 is in the closest position will be referred to as a second dimension L2. The second dimension L2 is also the shortest distance from the outer face 41a of the main body 41 to the insulating end face 42a of the side wall 42. This shortest distance from the outer face 41a of the main body 41 to the insulating end face 42a of the side wall 42 is the height of the insulating member 40 along the opposing direction Z. Therefore, the second dimension L2 equals to the height of the insulating member 40. In this embodiment, a relationship of the first dimension L1<the second dimension L2 is established. Thus, the height of the insulating member 40 is longer than the distance from the inner face 11c of the lid 11b to the device end face 22b. The second dimension L2 is shorter than the opposing distance L along the opposing direction Z.

Next, the operation of the rechargeable battery 10 configured as described above will be described, together with the method of assembling the rechargeable battery 10.

First, the electrode assembly 12 is formed, after which the positive conductor member 22 is welded to the positive tab stack 18, and the positive terminal 16 including the current interrupting device 25 is welded to this positive conductor member 22. The negative conductor member 21 is welded to the negative tab stack 19, and then the negative terminal 17 is welded to the negative conductor member 21. Next, the main body 41 of the insulating member 40 is capped on the negative conductor member 21 and positive conductor member 22. With the insulating member 40 being integrated with the negative conductor member 21 and positive conductor member 22, the external threads of the positive terminal 16 and negative terminal 17 are passed through the lid 11b, and nuts 16b and 17b are engaged with the external threads of the positive and negative electrodes, respectively. As a result, the positive terminal 16 and negative terminal 17 are fastened to the lid 11b, and the lid 11b and the electrode assembly 12 are integrated.

Figure 4:
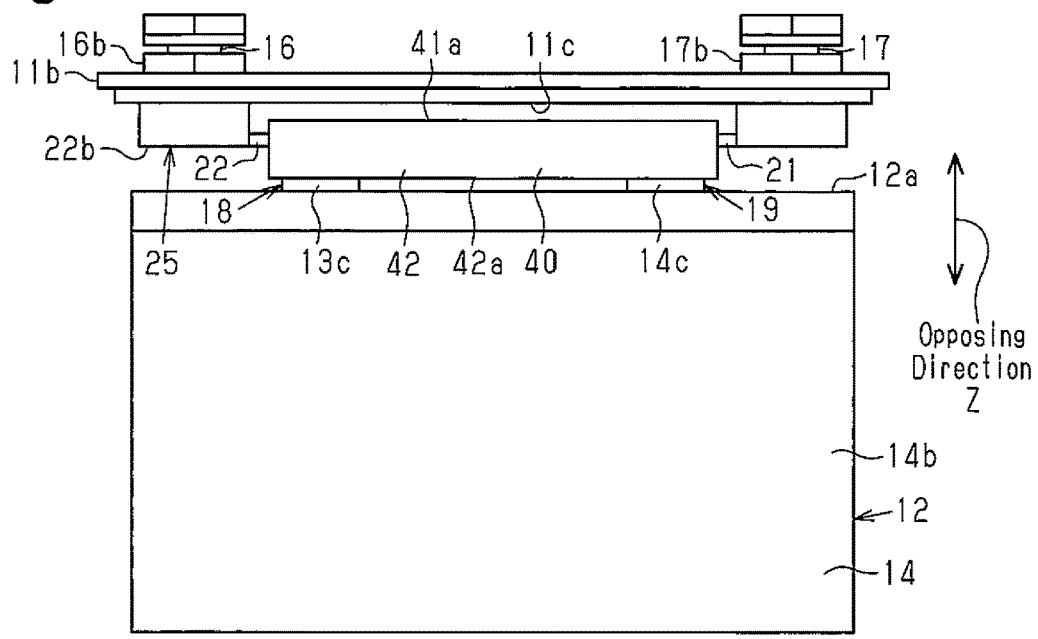
FIG. 4 is a diagram illustrating a state where the electrode assembly and a lid are integrated.

As shown in FIG. 4, when the lid 11b and the electrode assembly 12 are integrated, the outer face 41a of the insulating member 40 is distanced from the inner face 11c of the lid 11b in the opposing direction Z. In the current interrupting device 25, the device end face 22b of the positive conductor member 22 is distanced from the tab-side end face 12a of the electrode assembly 12 in the opposing direction Z, and the insulating end face 42a of the insulating member 40 is also distanced from the tab-side end face 12a of the electrode assembly 12 in the opposing direction Z. The positive tab stack 18 and negative tab stack 19 are each folded back from one end toward the other end of the stacking direction.

Next, the electrode assembly 12 is inserted into the case body 11a from the opening of the case body 11a as shown in FIG. 5. The lid 11b is pressed toward the electrode assembly 12 at this time so as to push the electrode assembly 12 into the case body 11a via the positive terminal 16, negative terminal 17, negative conductor member 21, positive conductor member 22, positive tab stack 18, and negative tab stack 19 that are integrated to the lid 11b. This compresses the positive tab stack 18 and negative tab stack 19 in the opposing direction Z and displaces them, so that the outer face 41a of the insulating member 40 is brought into contact with the inner face 11c of the lid 11b. As the lid 11b is further pushed in toward the tab-side end face 12a, the positive tab stack 18 and negative tab stack 19 are compressed and displaced in the opposing direction Z, so that the insulating end face 42a of the insulating member 40 is brought into contact with the tab-side end face 12a of the electrode assembly 12. Because of the relationship of the first dimension L1<the second dimension L2, even when the insulating end face 42a of the insulating member 40 is in contact with the tab-side end face 12a, the device end face 22b of the positive conductor member 22, which constitutes the current interrupting device 25, stays away from the tab-side end face 12a in the opposing direction Z.

After that, when the electrode assembly 12 is completely accommodated in the case body 11a, and when the lid 11b and the case body 11a are bonded together to close the opening of the case body 11a, the assembling of the rechargeable battery 10 is complete.

The above-described embodiment achieves the following advantages.

(1) The first dimension L1 is defined for the current interrupting device 25 and the second dimension L2 is defined for the insulating member 40, and each component is designed so as to establish the relationship of L1<L2. In assembling the rechargeable battery 10, the electrode assembly 12 is inserted into the case body 11a in a state where the lid 11b and the electrode assembly 12 are integrated. When the lid 11b is pushed toward the electrode assembly 12, the insulating end face 42a of the insulating member 40 contacts the tab-side end face 12a of the electrode assembly 12 before the device end face 22b of the current interrupting device 25 does. Thus, the contact between the device end face 22b of the current interrupting device 25 and the tab-side end face 12a is restrained during insertion of the electrode assembly 12 into the case body 11a, so that the current interrupting device 25 is restrained from being subjected to a load due to the device end face 22b contacting the tab-side end face 12a. As a result, the possibilities of malfunctions of the current interrupting device 25 and damage to the current interrupting device 25 are minimized.

When the rechargeable battery 10 is mounted to a vehicle or subjected to vibration during transportation, the positive tabs 13c and negative tabs 14c may displace and the electrode assembly 12 may move closer to the current interrupting device 25. Even in such cases, because of the relationship established between the first dimension L1 and the second dimension L2 (L1<L2), the tab-side end face 12a of the electrode assembly 12 contacts the insulating end face 42a of the insulating member 40. Thus, even when the rechargeable battery 10 vibrates, the contact between the tab-side end face 12a of the electrode assembly 12 and the device end face 22b of the current interrupting device 25 is restrained, so that the possibilities of malfunctions of the current interrupting device 25 and damage to the current interrupting device 25 are minimized.

(2) The insulating member 40 insulates the negative conductor member 21 and positive conductor member 22 from the lid 11b. Therefore, the main body 41 of the insulating member 40 is located between the negative conductor member 21 and positive conductor member 22 and the lid 11b in the opposing direction Z. When the lid 11b is pressed toward the electrode assembly 12 during assembly of the rechargeable battery 10, the inner face 11c of the lid 11b is brought into contact with the outer face 41a of the insulating member 40, and as the lid 11b is pressed further, the insulating member 40 is pressed further toward the electrode assembly 12. When the rechargeable battery 10 vibrates, the insulating member 40 makes contact with the inner face 11c of the lid 11b, which restricts the movement of the insulating member 40 toward the lid 11b. Since the second dimension L2 is set for this insulating member 40, the insulating member 40 can contact the electrode assembly 12 before the current interrupting device 25 does during assembly. When subjected to vibration, the tab-side end face 12a of the electrode assembly 12 is restrained from contacting the current interrupting device 25 and thus the current interrupting device 25 can be protected.

(3) The positive terminal 16 and positive tabs 13c are arranged in the arrangement direction X, and the negative terminal 17 and negative tabs 14c are arranged in the arrangement direction X. Namely, the positive terminal 16 and positive tabs 13c do not overlap in the opposing direction Z, and the negative terminal 17 and negative tabs 14c do not overlap in the opposing direction Z. Therefore, as compared to the case where the electrode terminals and tabs overlap in the opposing direction Z, the rechargeable battery 10 can be reduced in size along the opposing direction Z. In the positive electrode, in particular, the current interrupting device 25 is integrated with the positive terminal 16. Since the positive terminal 16 and positive tabs 13c are arranged in the arrangement direction X, the presence of the current interrupting device 25 does not affect the size reduction of the rechargeable battery 10 in the opposing direction Z.

(4) The insulating member 40 extends over the negative conductor member 21 and the positive conductor member 22. Therefore, when the lid 11b is pressed toward the electrode assembly 12, the load is applied from the single insulating member 40 to two conductor members 21 and 22. Thus, the individual conductor members 21 and 22 are restrained from being receiving load separately, so that the conductor members 21 and 22 develop less bending stress, which in turn means that the current interrupting device 25 in the positive electrode develops less bending stress.

(5) The height of the insulating member 40 equals to the second dimension L2. Therefore, when the inner face 11c of the lid 11b is caused to contact and pressed against the outer face 41a of the main body 41 of the insulating member 40, the device end face 22b of the current interrupting device 25 is restrained from contacting the tab-side end face 12a with the use of the height of the insulating member 40. When the rechargeable battery 10 vibrates, the tab-side end face 12a is restrained from contacting the device end face 22b with the use of the height of the insulating member 40. Thus, the contact between the device end face 22b of the current interrupting device 25 and the tab-side end face 12a is restrained with the use of a constituent element of the rechargeable battery 10 during insertion of the electrode assembly 12 into the case body 11a or when subjected to vibration.

Second Embodiment

Next, a rechargeable battery 10 as a power storage device according to a second embodiment of will be described with reference to FIGS. 6 to 9. Detailed description of the features of the second embodiment that are similar to those of the first embodiment will be omitted.

Figure 6:
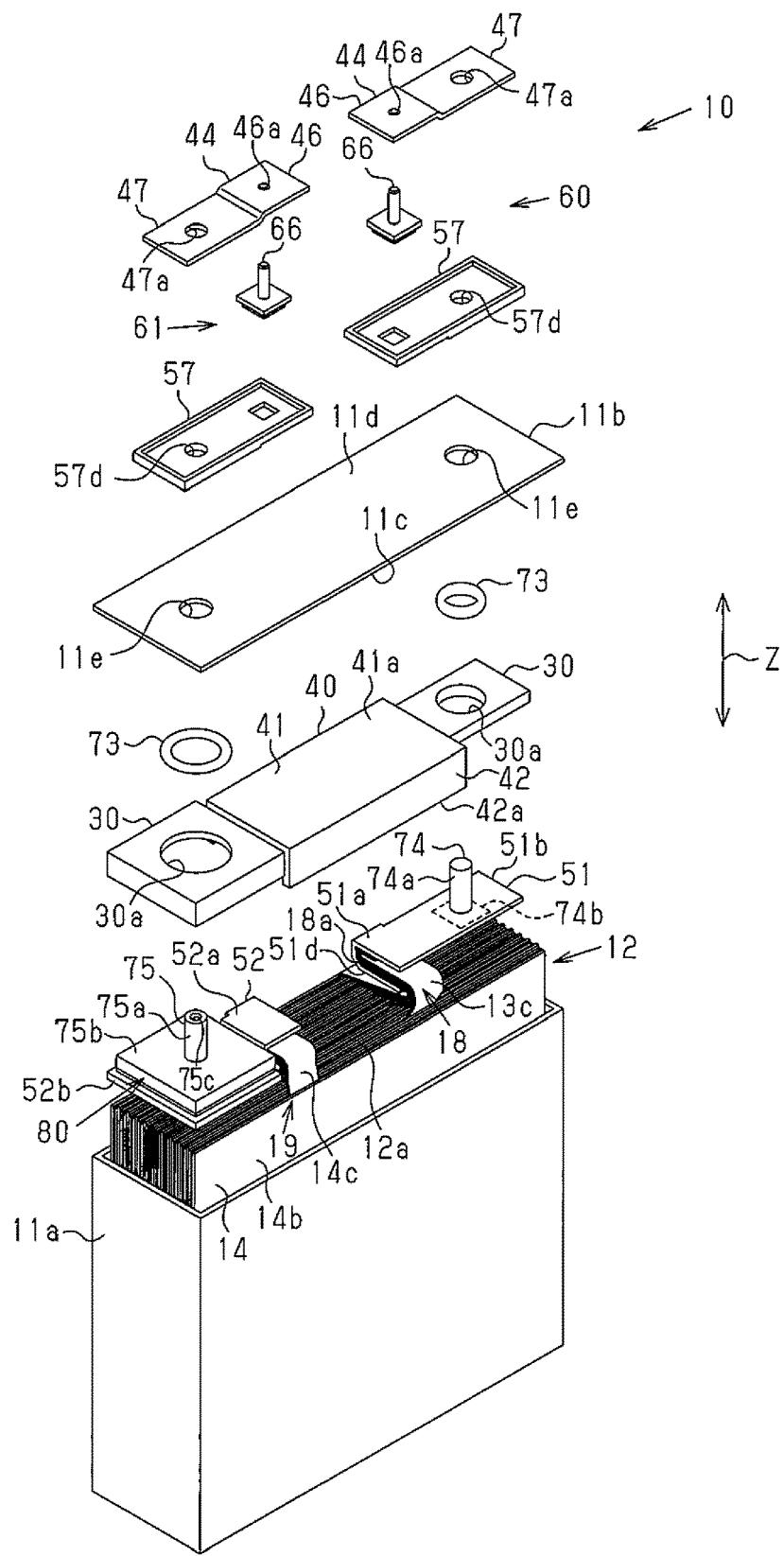
FIG. 6 is an exploded perspective view illustrating a rechargeable battery of a second embodiment.
Figure 7:
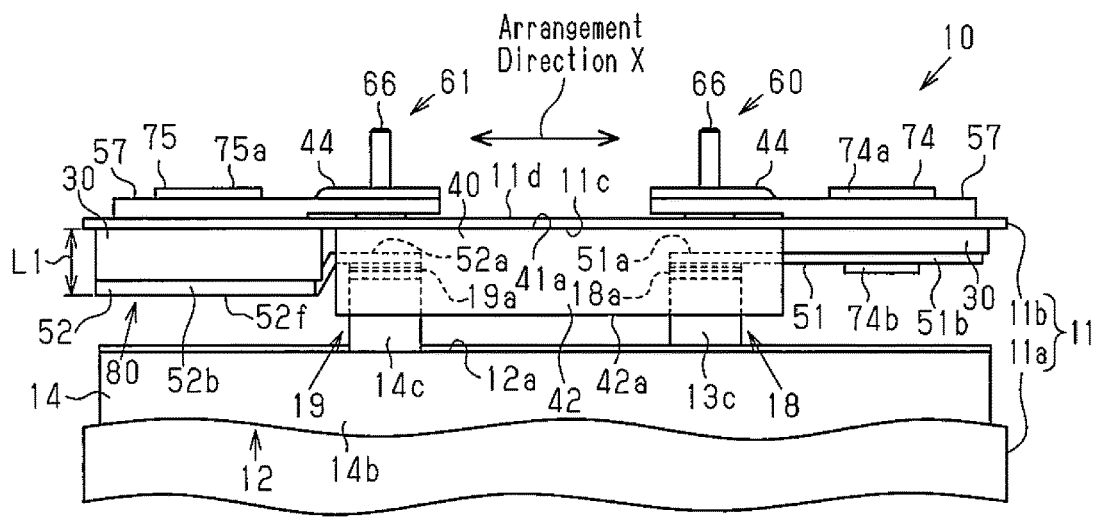
FIG. 7 is a partial cross-sectional view illustrating the inside of the rechargeable battery of the second embodiment.

As shown in FIGS. 6 and 7, a positive conductor member 51 is joined to the positive tab stack 18. A negative conductor member 52 is joined to the negative tab stack 19. The positive conductor member 51 and negative conductor member 52 are arranged between the inner face 11c of the lid 11b and the tab-side end face 12a of the electrode assembly 12.

The positive conductor member 51 has a first end and a second end in the longitudinal direction, and a U-shaped (channel shaped) electrode joint portion 51a joined to the positive tab stack 18 at the first end. The electrode joint portion 51a has a joint piece 51d in a portion that faces the tab-side end face 12a. The positive tab stack 18 is welded to this joint piece 51d. The positive tab stack 18 is gathered at one end in the stacking direction and folded toward the other end. The positive tab stack 18 includes a protruding portion 18a that protrudes from the folded part toward the other end in the stacking direction.

The joint piece 51d of the electrode joint portion 51a is joined to the protruding portion 18a of the positive tab stack 18 from the corresponding to the tab-side end face 12a. The joint piece 51d covers the protruding portion 18a of the positive tab stack 18 from the side corresponding to the electrode assembly 12. The joint portion between the positive tab stack 18 and the electrode joint portion 51a is positioned between the inner face 11c of the lid 11b and the tab-side end face 12a. The positive conductor member 51 includes a flat plate-like terminal connecting portion 51b at the second end in the longitudinal direction. The electrode joint portion 51a and the terminal connecting portion 51b are continuous along the longitudinal direction. The terminal connecting portion 51b of the positive conductor member 51 has a through-hole (not shown).

Figure 8:
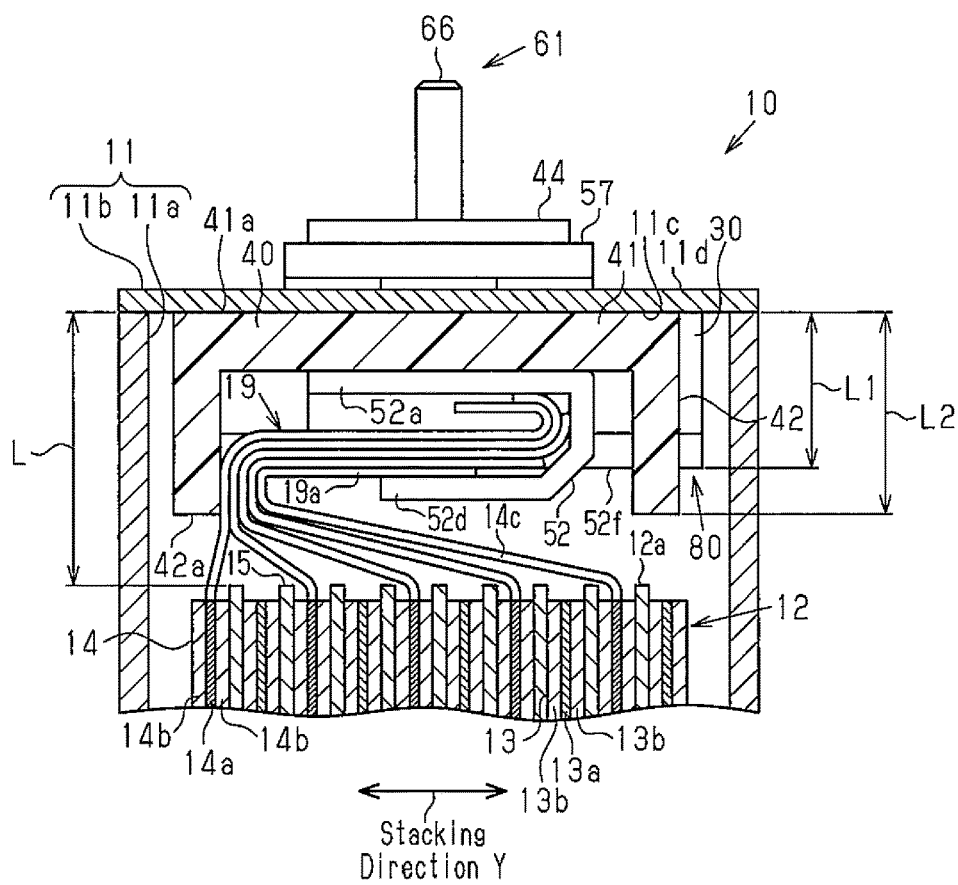
FIG. 8 is a partial cross-sectional side view illustrating the inside of the rechargeable battery of the second embodiment.

As shown in FIGS. 6 and 8, the negative conductor member 52 has a U-shaped (channel-shaped) electrode joint portion 52a electrically joined to the negative tab stack 19 at a first end in the longitudinal direction. The electrode joint portion 52a has a joint piece 52d in a portion that faces the tab-side end face 12a. The negative tab stack 19 is welded to this joint piece 52d. The negative tab stack 19 is gathered at one end in the stacking direction and folded toward the other end. The negative tab stack 19 includes a protruding portion 19a that protrudes from the folded part toward the other end in the stacking direction.

The joint piece 52d of the electrode joint portion 52a is joined to the protruding portion 19a of the negative tab stack 19 from the side corresponding to the tab-side end face 12a. The joint piece 52d covers the protruding portion 19a of the negative tab stack 19 from the side corresponding to the electrode assembly 12. The joint portion between the negative tab stack 19 and the electrode joint portion 52a is positioned between the inner face 11c of the lid 11b and the tab-side end face 12a. The negative conductor member 52 includes a terminal connecting portion 52b at the second end in the longitudinal direction. The electrode joint portion 52a and the terminal connecting portion 52b are continuous along the longitudinal direction.

Next, the positive terminal structure 60 and negative terminal structure 61 will be described. Since the positive terminal structure 60 and negative terminal structure 61 are configured basically the same except for the current interrupting device, the members common to them will be described using the same reference numerals.

As shown in FIG. 6, the lid 11b has through-holes 11e near either end in the longitudinal direction. The positive terminal structure 60 and negative terminal structure 61 each have an outer insulating member 57 arranged on the outer face 11d of the lid 11b. The outer insulating members 57 insulate a positive external connection terminal 66 and a positive terminal lead 74 from the lid 11b, and insulate a negative external connection terminal 66 and a negative terminal lead 75 from the lid 11b. The outer insulating members 57 are made of synthetic resin. The outer insulating members 57 each have a through-hole 57d.

The positive terminal structure 60 and negative terminal structure 61 each include the external connection terminal 66 arranged outside the lid 11b. The external connection terminals 66 allow a bus bar for electrically connecting rechargeable batteries 10 with each other to be secured outside the lid 11b. The external connection terminals 66 are made of metal. A nut for fastening the bus bar can be threaded to each of the external connection terminals 66.

The positive terminal structure 60 includes the positive terminal lead 74 as an electrode terminal electrically connected to the positive tab stack 18 of the electrode assembly 12 via the positive conductor member 51. The negative terminal structure 61 includes the negative terminal lead 75 as an electrode terminal electrically connected to the negative tab stack 19 of the electrode assembly 12 via the negative conductor member 52.

The positive terminal structure 60 includes a terminal connecting member 44 that electrically connects the positive external connection terminal 66 and the positive terminal lead 74, and the negative terminal structure 61 includes a terminal connecting member 44 that electrically connects the negative external connection terminal 66 and the negative terminal lead 75. The terminal connecting members 44 each include a connecting piece 46 at one end in the longitudinal direction, and a fixing piece 47 at the other end in the longitudinal direction. The connecting piece 46 of each terminal connecting member 44 has a through-hole 46a extending therethrough in the thickness direction, and the external connection terminals 66 are each passed through the through-holes 46a. The fixing piece 47 of each terminal connecting member 44 has a through-hole 47a extending therethrough in the thickness direction, and the positive terminal lead 74 and negative terminal lead 75 are each passed through the through-holes 47a.

The positive terminal lead 74 of the positive terminal structure 60 includes a connection rod part 74a and a base 74b continuous in the axis direction thereof. The base 74b of the positive terminal lead 74 is placed inside the case 11 from the inner face 11c of the lid 11b, while the connection rod part 74a passes through the through-hole of the positive conductor member 51, a through-hole 30a of an inner insulating member 30 to be described later, a through-hole 11e of the lid 11b, a through-hole 57d of the outer insulating member 57, and a through-hole 47a of the terminal connecting member 44. The inner insulating member 30 of the positive terminal structure 60 is located between the lid 11b and the terminal connecting portion 51b to restrict the contact between the lid 11b and the terminal connecting portion 51b and to insulate the lid 11b from the positive conductor member 51 in the positive terminal structure 60.

A distal end portion of the connection rod part 74a passing through the through-hole 47a of the terminal connecting member 44 is axially swaged. As shown in FIG. 7, the positive conductor member 51, inner insulating member 30, lid 11b, outer insulating member 57, and fixing piece 47 of the terminal connecting member 44 are sandwiched between the connection rod part 74a and the base 74b. The sandwiching achieved by the swaging fixes the positive terminal lead 74 to the lid 11b. An O-ring 73 shown in FIG. 6 makes tight contact with the periphery of the through-hole 11e in the inner face 11c of the lid 11b and provides a seal for the through-hole 11e of the lid 11b.

The distal end of the connection rod part 74a of the positive terminal lead 74 is electrically connected to the terminal connecting member 44. The base 74b of the positive terminal lead 74 is electrically connected to the positive conductor member 51.

As shown in FIG. 6, the negative terminal lead 75 of the negative terminal structure 61 includes a connection rod part 75a and a base 75b continuous in the axis direction thereof. The connection rod part 75a of the negative terminal lead 75 is passed through the through-hole 30a of the inner insulating member 30, the through-hole 11e of the lid 11b, the through-hole 57d of the outer insulating member 57, and the through-hole 47a of the terminal connecting member 44. The negative terminal lead 75 includes an axially extending bore 75c.

In the negative terminal structure 61, the inner insulating member 30 is located between the lid 11b and the base 75b of the negative terminal lead 75 to restrict the contact between the lid 11b and the base 75b and to insulate the lid 11b from the negative terminal lead 75.

In the negative terminal structure 61, a distal end portion of the connection rod part 75a passing through the through-hole 47a of the terminal connecting member 44 is axially swaged. As shown in FIG. 7, the inner insulating member 30, lid 11b, outer insulating member 57, and terminal connecting member 44 are sandwiched between the connection rod part 75a and the base 75b. The sandwiching achieved by the swaging fixes the negative terminal lead 75 to the lid 11b. An O-ring 73 shown in FIG. 6 makes tight contact with the periphery of the through-hole 11e in the inner face 11c of the lid 11b and provides a seal for the through-hole 11e of the lid 11b. The distal end of the connection rod part 75a of the negative terminal lead 75 is electrically connected to the terminal connecting member 44.

The rechargeable battery 10 includes a current interrupting device 80 integral with the negative terminal lead 75 that is one of the electrode terminals. The current interrupting device 80 is provided in the conduction path electrically connecting the negative tabs 14c (negative tab stack 19) and the negative terminal lead 75. The current interrupting device 80 is arranged inside the case 11. The pressure outside the case 11 is introduced to the current interrupting device 80 through the bore 75c of the negative terminal lead 75.

When the internal pressure of the case 11 exceeds the pressure level outside the case 11 and reaches a preset level, the current interrupting device 80 interrupts the current in the conduction path electrically connecting the electrode assembly 12 and the negative terminal lead 75. The current interrupting device 80 is in contact with the negative conductor member 52, so that the negative conductor member 52 can be regarded as part of the current interrupting device 80. Therefore, as shown in FIG. 7, one side of the negative conductor member 52 facing the tab-side end face 12a can be regarded as one side of the current interrupting device 80 facing the tab-side end face 12a. This side of the negative conductor member 52 facing the tab-side end face 12a will be referred to as a device end face 52f.

As shown in FIG. 8, the current interrupting device 80 is integrated with the negative terminal lead 75, which is fixed to the lid 11b by swaging. Therefore, the current interrupting device 80 is not able to be displaced relative to the lid 11b. Accordingly, the current interrupting device 80 is always positioned closest to the lid 11b. The distance from the inner face 11c of the lid 11b to the device end face 52f along the opposing direction Z equals to the first dimension L1. This first dimension L1 is shorter than the opposing distance L, which means that the device end face 52f is distanced from the tab-side end face 12a of the electrode assembly 12 along the opposing direction Z inside the rechargeable battery 10.

In the rechargeable battery 10 of the second embodiment configured as described above, the insulating member 40 is located between the electrode joint portions 51a and 52a and the lid 11b and insulates them from each other. The insulating end face 42a of the side wall 42 is positioned so as to protrude toward the tab-side end face 12a so that they are closer to the tab-side end face 12a than the joint pieces 51d and 52d of the electrode joint portions 51a and 52a. In the second embodiment, the relationship of the first dimension L1<the second dimension L2 is also established when the insulating member 40 is in the closest position.

Next, the method of assembling the rechargeable battery 10 according to the second embodiment will be described.

The negative terminal lead 75, current interrupting device 80, and negative conductor member 52 have already been joined together. First, the outer insulating members 57 are set on the outer face 11d of the lid 11b. The external connection terminals 66 are then supported by the outer insulating members 57. Next, the external connection terminals 66 are inserted into the through-holes 46a of the terminal connecting members 44.

Next, on the positive electrode side, an O-ring 73 and the inner insulating member 30 are set on the inner face 11c of the lid 11b, and so is the positive conductor member 51. On the negative electrode side, an O-ring 73 and the inner insulating member 30 are set on the inner face 11c of the lid 11b, and so is the negative conductor member 52. At this time, the main body 41 of the insulating member 40 is positioned between the positive electrode joint portion 51a and negative electrode joint portion 52a and the inner face 11c of the lid 11b.

The connection rod part 74a of the positive terminal lead 74 is then inserted into the through-hole of the positive conductor member 51, the through-hole 30a of the inner insulating member 30, the O-ring 73, the through-hole 11e of the lid 11b, the through-hole 57d of the outer insulating member 57, and the through-hole 47a of the terminal connecting member 44. On the negative electrode side, the connection rod part 75a of the negative terminal lead 75 is inserted into the through-hole 30a of the inner insulating member 30, the O-ring 73, the through-hole 11e of the lid 11b, the through-hole 57d of the outer insulating member 57, and the through-hole 47a of the terminal connecting member 44.

The connection rod part 74a of the positive electrode is swaged, so that the terminal connecting portion 51b, inner insulating member 30, O-ring 73, lid 11b, outer insulating member 57, and terminal connecting member 44 are integrated, between the base 74b and the distal end portion of the connection rod part 74a. The connection rod part 75a of the negative electrode is swaged, so that the inner insulating member 30, O-ring 73, lid 11b, outer insulating member 57, and terminal connecting member 44 are integrated, between the base 75b and the distal end portion of the connection rod part 75a, and at the same time, the current interrupting device 80 is also integrated.

The positive terminal structure 60 and negative terminal structure 61 are thus set on the lid 11b, and the insulating member 40 is integrated with the lid 11b. The positive tab stack 18 is then joined to the electrode joint portion 51a of the positive conductor member 51 by laser welding, and the negative tab stack 19 is joined to the electrode joint portion 52a of the negative conductor member 52 by laser welding. The electrode joint portions 51a and 52a are not bent in a U-shape (channel shape) and flat before being joined to the tab stacks 18 and 19 by laser welding. Next, the electrode joint portions 51a and 52a are bent into a U-shape (channel shape), and the positive tab stack 18 and the negative tab stack 19 are bent. The protruding portions 18a and 19a are then covered by the joint pieces 51d and 52d from the corresponding to the electrode assembly 12. As a result, the lid 11b and the electrode assembly 12 are integrated via the positive tab stack 18 and negative tab stack 19.

The electrode assembly 12 is then inserted into the case body 11a. The electrode assembly 12 is pushed into the case body 11a at this time. After the electrode assembly 12 is inserted into the case body 11a, the lid 11b is joined to the open end of the case body 11a, which completes the assembling of the rechargeable battery 10.

Therefore, in addition to the advantages (1) to (5) of the first embodiment, the second embodiment achieves the following advantage.

(6) The relationship of the first dimension L1<the second dimension L2 is established when the insulating member 40 is integrated with the lid 11b in advance. Therefore, the contact between the current interrupting device 80 and the electrode assembly 12 is restrained by the insulating member 40.

The above described embodiment may be modified as follows.

Figure 9:
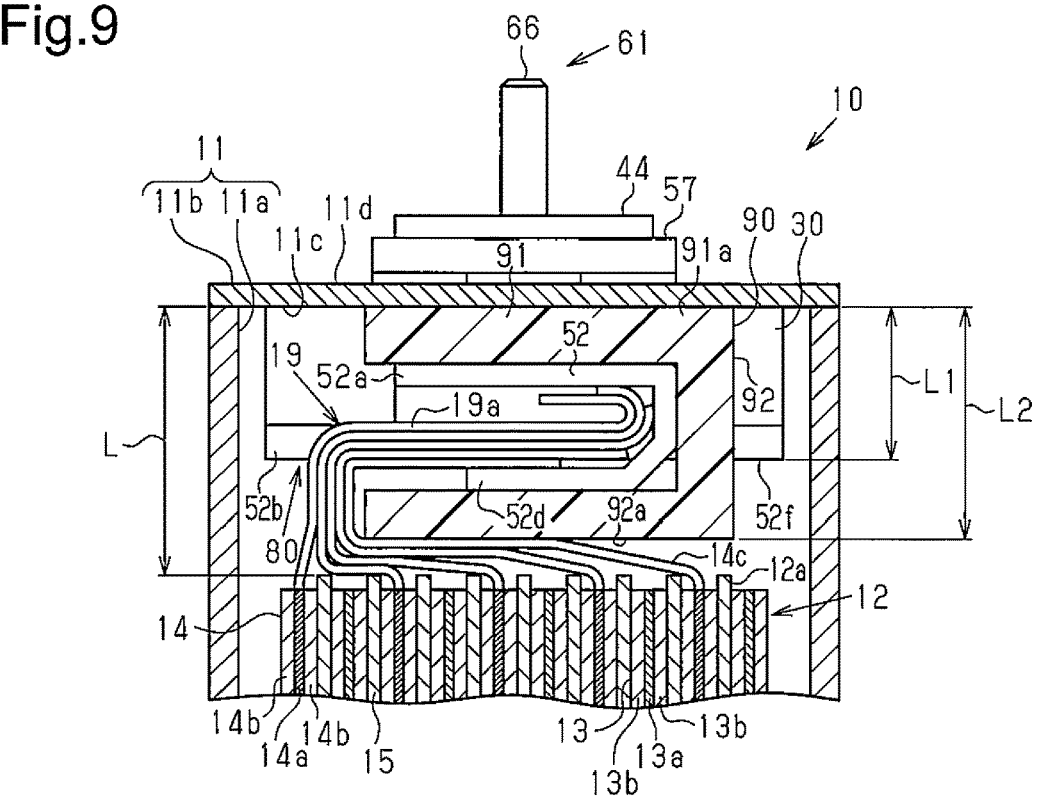
FIG. 9 is a partial cross-sectional side view illustrating the inside of a rechargeable battery of a modification.
Figure 10:
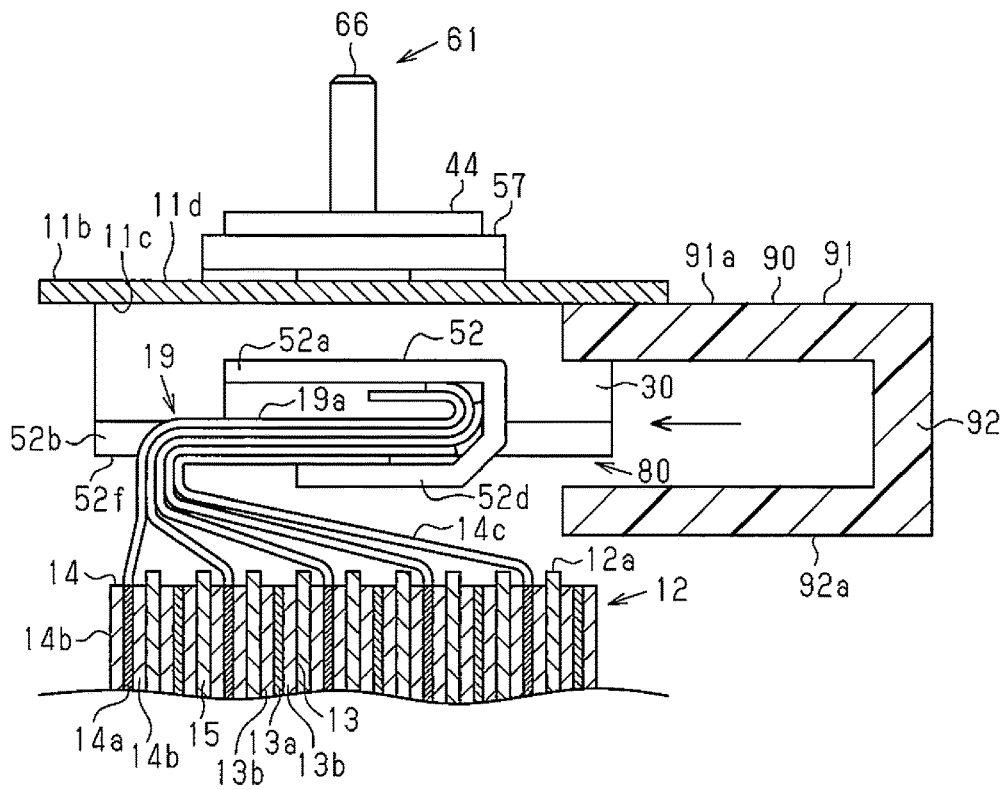
FIG. 10 is a partial cross-sectional side view illustrating a state where an insulating member is mounted in another modification.

In the second embodiment, as shown in FIG. 9, the insulating member 90 may be U-shaped (channel shaped) open to one side in the transverse direction of the insulating member 90 in side view when viewed from the longitudinal direction thereof. FIGS. 9 and 10 illustrate only the configuration of the negative electrode side. The positive electrode side has similar configuration to that of the negative electrode side. The insulating member 90 has a rectangular flat plate-like main body 91. The main body 91 is located between the electrode joint portions 51a and 52a and the lid 11b, and insulates them from each other. The insulating member 90 also has a side wall 92. The side wall 92 protrudes from one long side of the main body 91 toward the electrode assembly 12 in an L-shape. The side wall 92 covers the protruding portion 18a of the positive tab stack 18 and the protruding portion 19a of the negative tab stack 19 from the electrode assembly 12 side. The surface of the side wall 92 facing the tab-side end face 12a will be referred to as an insulating end face 92a. The position where the insulating member 90 is located closest to the lid 11b, with the outer face 91a of the main body 91 of the insulating member 90 being in contact with the inner face 11c of the lid 11b, will be referred to as a closest position. The distance from the inner face 11c of the lid 11b to the insulating end face 92a of the side wall 92 along the opposing direction Z when the insulating member 90 is in the closest position equals to the second dimension L2. The second dimension L2 equals to the height of the side wall 92. The relationship of the first dimension L1<the second dimension L2 is established also with the insulating member 90.

Next, the method of assembling the rechargeable battery 10 will be described.

First, the positive terminal structure 60 and negative terminal structure 61 are set on the lid 11b. Next, the positive tab stack 18 is joined to the electrode joint portion 51a of the positive conductor member 51 by laser welding, and the negative tab stack 19 is joined to the electrode joint portion 52a of the negative conductor member 52 by laser welding. Next, the electrode joint portions 51a and 52a are bent into a U-shape (channel shape), and the positive tab stack 18 and negative tab stack 19 are bent. The protruding portions 18a and 19a are then covered by the joint pieces 51d and 52d from the side corresponding to the electrode assembly 12. As a result, the lid 11b and the electrode assembly 12 are integrated. When the lid 11b and the electrode assembly 12 are integrated, there is a gap between the lid 11b and the electrode joint portions 51a and 52a.

With the open side along the longitudinal direction of the insulating member 90 faced with the bent parts of the electrode joint portions 51a and 52a as shown in FIG. 10, the insulating member 90 is slid toward the electrode joint portions 51a and 52a. The main body 91 is inserted into the gap between the electrode joint portions 51a and 52a and the lid 11b, and one end of the side wall 92 closer to the tab-side end face 12a is inserted to between the joint pieces 51d and 52d and the tab-side end face 12a. The main body 91 of the insulating member 90 is then supported by the electrode joint portions 51a and 52a, and the joint pieces 51d and 52d are covered by part of the side wall 92 from the electrode assembly 12 side.

This configuration allows the insulating member 90 to be mounted even after the positive terminal structure 60 and negative terminal structure 61 are set on the lid 11b.

While the height of the insulating member 40, 90 is designated as second dimension L2 in each embodiment, this need not necessarily be so. For example, if there is an additional component between the outer face 41a, 91a of the main body 41, 91 of the insulating member 40, 90 and the inner face 11c of the lid 11b, the second dimension L2 will be the sum of the height of this additional component and the height of the insulating member 40, 90.

In each embodiment, the insulating members 40 and 90 may be divided into a negative electrode insulating member located between the negative conductor member 21, 52 and the lid 11b, and a positive electrode insulating member located between the positive conductor member 22, 51 and the lid 11b.

In the first embodiment, the insulating member 40 insulates the negative conductor member 21 and positive conductor member 22 from the lid 11b, but this need not necessarily be so. For example, when the current interrupting device 25 is not provided on the positive terminal 16 but midway in the long-side direction of the positive conductor member 22, an insulating member that insulates the positive terminal 16 from the electrode assembly 12 is provided to a surface of the positive terminal 16 opposed to the tab-side end face 12a. In this case, the surface of the insulating member provided for the positive terminal 16 opposed to the tab-side end face 12a will be the insulating end face. When the electrode assembly 12 is inserted into the case body 11a, the insulating member comes closest to the inner face 11c of the lid 11b as the lid 11b is pushed toward the electrode assembly 12. The second dimension L2 is set in this closest position. The current interrupting device 25 is provided to the positive conductor member 22. Therefore, when the electrode assembly 12 is inserted into the case body 11a, the current interrupting device 25 comes closest to the inner face 11c of the lid 11b as the lid 11b is pushed toward the electrode assembly 12. The first dimension L1 of the current interrupting device 25 is set in this state. Each component is designed such that the relationship of L1<L2 is established between the first dimension L1 of the current interrupting device 25 and the second dimension L2 of the insulating member.

In the first embodiment, the current interrupting device 25 does not necessarily need to be arranged in the conduction path of the positive electrode, and may be provided on the negative electrode side, in a conduction path electrically connecting the negative tabs 14c and the negative terminal 17. In the second embodiment, the current interrupting device 80 does not necessarily need to be arranged in the conduction path of the negative electrode, and may be provided on the positive electrode side, in a conduction path electrically connecting the positive tabs 13c and the positive terminal lead 74.

In each embodiment, the structure of the current interrupting devices 25 and 80 is not limited to that of the embodiment, and may be changed as required.

In the first embodiment, the positive terminal 16 may be arranged to overlap the positive tab stack 18 in the opposing direction Z, with the positive conductor member 22 positioned therebetween, and the negative terminal 17 may be arranged to overlap the positive tab stack 18 in the opposing direction Z, with the negative conductor member 21 positioned therebetween.

In each embodiment, the electrode assembly may be of a spiral-type having a long strip of positive electrode and a long strip of negative electrode wound around, with a separator located therebetween.

The positive electrodes 13 may have the active material layer 13b only on one side. Similarly, the negative electrodes 14 may have the active material layer 14b only on one side.

The separators 15 may be in the form of bags that encase the positive electrodes 13 or negative electrodes 14.

The positive electrode 13 and negative electrode 14 may be provided one each.

The rechargeable battery 10 is not limited to a lithium ion rechargeable battery, and may be other rechargeable batteries such as a nickel-metal hydride rechargeable battery or a nickel cadmium rechargeable battery.

The power storage device is not limited to the rechargeable battery 10, and may be a capacitor, such as, for example, an electric double-layer capacitor or a lithium ion capacitor.

DESCRIPTION OF THE REFERENCE NUMERALS

X: Arrangement direction
Z: Opposing direction
L1: First dimension
L2: Second dimension
10: Rechargeable battery as a power storage device
11: Case
11a: Case body
11b: Lid
11c: Inner face
12: Electrode assembly
12a: Tab-side end face
13: Positive electrode
13c: Positive tab as a tab
14: Negative electrode
14c: Negative tab as a tab
16: Positive terminal as an electrode terminal
17: Negative terminal as an electrode terminal
21, 52: Negative conductor member
22, 51: Positive conductor member
22b, 52f: Device end face
25, 80: Current interrupting device
40, 90: Insulating member
41a: Outer face
42a, 92a: Insulating end face
74: Positive terminal lead as an electrode terminal
75: Negative terminal lead as an electrode terminal

The invention claimed is:

1. A power storage device, comprising:
an electrode assembly configured by stacking electrodes having tabs;
a case configured to accommodate the electrode assembly, the case having a case body with an opening and a lid, which closes the opening;
an electrode terminal electrically connected to the tabs and passing through the lid to protrude out of the case;
a current interrupting device arranged in a conduction path that electrically connects the tabs and the electrode terminal; and
an insulating member arranged inside the case, wherein
the electrode assembly has a tab-side end face opposed to an inner face of the lid, wherein the tabs protrude from the tab-side end face,
the current interrupting device is arranged in a space defined between the tab-side end face and the inner face of the lid,
a direction of a line that connects the inner face of the lid and the tab-side end face with a shortest distance is defined as an opposing direction,
the current interrupting device has a device end face opposed to the tab-side end face,
the insulating member has an insulating end face opposed to the tab-side end face,
a distance from the inner face of the lid to the device end face along the opposing direction in a state where the current interrupting device is positioned closest to the inner face of the lid is defined as a first dimension,
a distance from the inner face of the lid to the insulating end face along the opposing direction in a state where the insulating member is positioned closest to the inner face of the lid is defined as a second dimension,
the first dimension is smaller than the second dimension, and
the entire insulating member is arranged at a position not overlapping with the current interrupting device in the opposing direction.

2. The power storage device according to claim 1, wherein the tabs of mutually different polarities protrude from the tab-side end face.

3. The power storage device according to claim 2, wherein the electrode terminal and the tabs having the same polarity are arranged along an arrangement direction that is a direction of a line extending along the tab-side end face and connecting the tabs of mutually different polarities.

4. The power storage device according to claim 1, wherein, when the insulating member is positioned closest to the inner face of the lid, an outer face of the insulating member contacts the inner face of the lid, and the second dimension is a height of the insulating member from the insulating end face to the outer face.

5. The power storage device according to claim 1, wherein the power storage device is a rechargeable battery.

6. The power storage device according to claim 1, wherein the insulating member is arranged between a portion of the conduction path other than the current interrupting device and the inner face of the lid and insulates the portion of the conduction path other than the current interrupting device from the lid.

7. The power storage device according to claim 1, wherein the current interrupting device includes
an invertible plate electrically connected to the electrode terminal, wherein the invertible plate has a displacement portion that is displaced toward the lid when internal pressure of the case exceeds a predetermined level, and
a separable portion that is part of the conduction path, wherein the separable portion is connected to the displacement portion and configured to separate from the conductor member as the displacement portion is displaced toward the lid.

8. The power storage device according to claim 1, wherein
the tabs includes positive tabs and negative tabs, which are arranged side by side in an arrangement direction that is a direction of a line extending along the tab-side end face,
the electrode terminal is one of a positive electrode terminal and a negative electrode terminal, and
the entire insulating member is arranged at a position different from that of the current interrupting device in the arrangement direction.

9. A power storage device, comprising:
an electrode assembly configured by stacking positive electrodes and negative electrodes, the positive electrodes having positive tabs and the negative electrodes having negative tabs;
a case configured to accommodate the electrode assembly, the case having a case body with an opening and a lid, which closes the opening;
a positive electrode terminal passing through the lid to protrude out of the case;
a negative electrode terminal passing through the lid to protrude out of the case;
a positive conductor member electrically connecting the positive electrode terminal to the positive tabs,
a negative conductor member electrically connecting the negative electrode terminal to the negative tabs,
a current interrupting device arranged in one of the positive conductor member and the negative conductor member,
an insulating member arranged inside the case, wherein
the electrode assembly has a tab-side end face opposed to an inner face of the lid, wherein the positive tabs and the negative tabs protrude from the tab-side end face,
the positive conductor member and the negative conductor member are arranged side by side in an arrangement direction that is a direction of a line extending along the tab-side end face,
the current interrupting device is arranged in a space defined between the tab-side end face and the inner face of the lid,
the insulating member extends over the positive conductor member and the negative conductor member and includes
a main body having a long side edge extending in the arrangement direction, and
a side wall extending from the long side edge of the main body toward the electrode assembly,
a direction of a line that connects the inner face of the lid and the tab-side end face with a shortest distance is defined as an opposing direction,
the current interrupting device has a device end face opposed to the tab-side end face,
the side wall of the insulating member has an insulating end face opposed to the tab-side end face,
a distance from the inner face of the lid to the device end face along the opposing direction in a state where the current interrupting device is positioned closest to the inner face of the lid is defined as a first dimension,
a distance from the inner face of the lid to the insulating end face along the opposing direction in a state where the insulating member is positioned closest to the inner face of the lid is defined as a second dimension, and
the first dimension is smaller than the second dimension and the entire insulating member is arranged at a position not overlapping with the current interrupting device in the opposing direction.

10. The power storage device according to claim 9, wherein the insulating member insulates the positive conductor member from the lid and insulates the negative conductor member from the lid.

11. The power storage device according to claim 9, wherein the electrode terminal and the tabs having the same polarity are arranged along the arrangement direction.

12. The power storage device according to claim 9, wherein, when the insulating member is positioned closest to the inner face of the lid, an outer face of the insulating member contacts the inner face of the lid, and the second dimension is a height of the insulating member from the insulating end face to the outer face.

13. The power storage device according to claim 9, wherein the power storage device is a rechargeable battery.

14. The power storage device according to claim 9, wherein the current interrupting device includes
an invertible plate electrically connected to the positive or negative electrode terminal, wherein the invertible plate has a displacement portion that is displaced toward the lid when internal pressure of the case exceeds a predetermined level, and
a separable portion that is part of the positive or negative conductor member, wherein the separable portion is connected to the displacement portion and configured to separate from the conductor member as the displacement portion is displaced toward the lid.

15. The power storage device according to claim 9, wherein the entire insulating member is arranged at a position not overlapping with the current interrupting device when viewing in the opposing direction.

16. The power storage device according to claim 9, wherein
the entire insulating member is arranged at a position different from that of the current interrupting device in the arrangement direction.

17. The power storage device according to claim 1, further comprising positive and negative conductor members, which are located between the inner face of the lid and the tab-side end face and constitute the conduction paths, wherein each of the positive and negative conductor members connects the electrode terminal and the tabs having a same polarity, and the insulating member insulates the positive conductor member from the lid and insulates the negative conductor member from the lid.

18. The power storage device according to claim 17, wherein the insulating member is arranged to extend over the conductor members of mutually different polarities.

\* \* \* \* \*